United States Patent [19]

Palmer

[11] Patent Number: 5,681,014
[45] Date of Patent: Oct. 28, 1997

[54] TORSIONAL TWIST AIRFOIL CONTROL MEANS

[76] Inventor: Harry W. Palmer, P.O. Box 821, Denmark, Me. 04022

[21] Appl. No.: 323,779

[22] Filed: Oct. 17, 1994

Related U.S. Application Data

[63] Continuation-in-part of Ser. No. 885,037, May 15, 1992, abandoned.

[51] Int. Cl.⁶ .............. B64C 3/44; B64C 3/52; B64D 15/10
[52] U.S. Cl. ............ 244/219; 244/48; 244/134 A; 244/206
[58] Field of Search ............... 244/201, 206, 244/219, 134 A, 134 E, 46, 48

[56] References Cited

U.S. PATENT DOCUMENTS

| | | |
|---|---|---|
| 821,393 | 5/1906 | Wright . |
| 983,697 | 2/1911 | Etrich . |
| 1,054,484 | 2/1913 | Anderson . |
| 1,132,686 | 3/1915 | Rooney . |
| 1,145,013 | 7/1915 | Gallaudet . |
| 1,796,860 | 3/1931 | Bowers . |
| 3,140,065 | 7/1964 | Alvarez-Calderon . |
| 3,734,432 | 5/1973 | Low . |
| 4,530,301 | 7/1985 | Latham ............... 244/219 |
| 4,729,528 | 3/1988 | Borzachillo . |
| 4,863,117 | 9/1989 | Riout ............... 244/46 |
| 5,000,399 | 3/1991 | Readnour et al. ............... 244/204 |
| 5,004,189 | 4/1991 | Igram ............... 244/219 |
| 5,114,104 | 5/1992 | Cincotta et al. ............... 244/219 |
| 5,181,678 | 1/1993 | Widnall et al. ............... 244/219 |

FOREIGN PATENT DOCUMENTS

| | | | |
|---|---|---|---|
| 347335 | 1/1922 | Germany ............... 244/219 |
| 294663 | 1/1929 | United Kingdom ............... 244/12.3 |
| 846322 | 8/1960 | United Kingdom . |

*Primary Examiner*—Virna Lissi Mojica

[57] ABSTRACT

A control system for aircraft airfoils, which is an improvement over existing aileron, flap, spoiler and deicing technologies, in providing increased roll control and aerodynamic lifting and braking functions; with greatly reduced drag increased airspeed and precise control performance at all airspeeds, due to clean uninterrupted airfoil surfaces and directional conformance of wing to the intended flight path.

This is accomplished by use of a torque tube mounted internally in the aeroelastic airfoil structure, and firmly attached to the airfoil tip structure. In operation the inboard end of the torque tube when rotated differentially on its pivot axis, imposes a helicoidal twist on the aeroelastic airfoil structure, with maximum angle of incidence at the outboard wing tip, providing near perfect lateral roll control or cooperating to provide increased lift and braking or maneuverability, also the foregoing operations provide automatic deicing. The torque tube can be operated by conventional control systems, e.g. cable/pulley, electric/hydraulic servo etc.

14 Claims, 1 Drawing Sheet

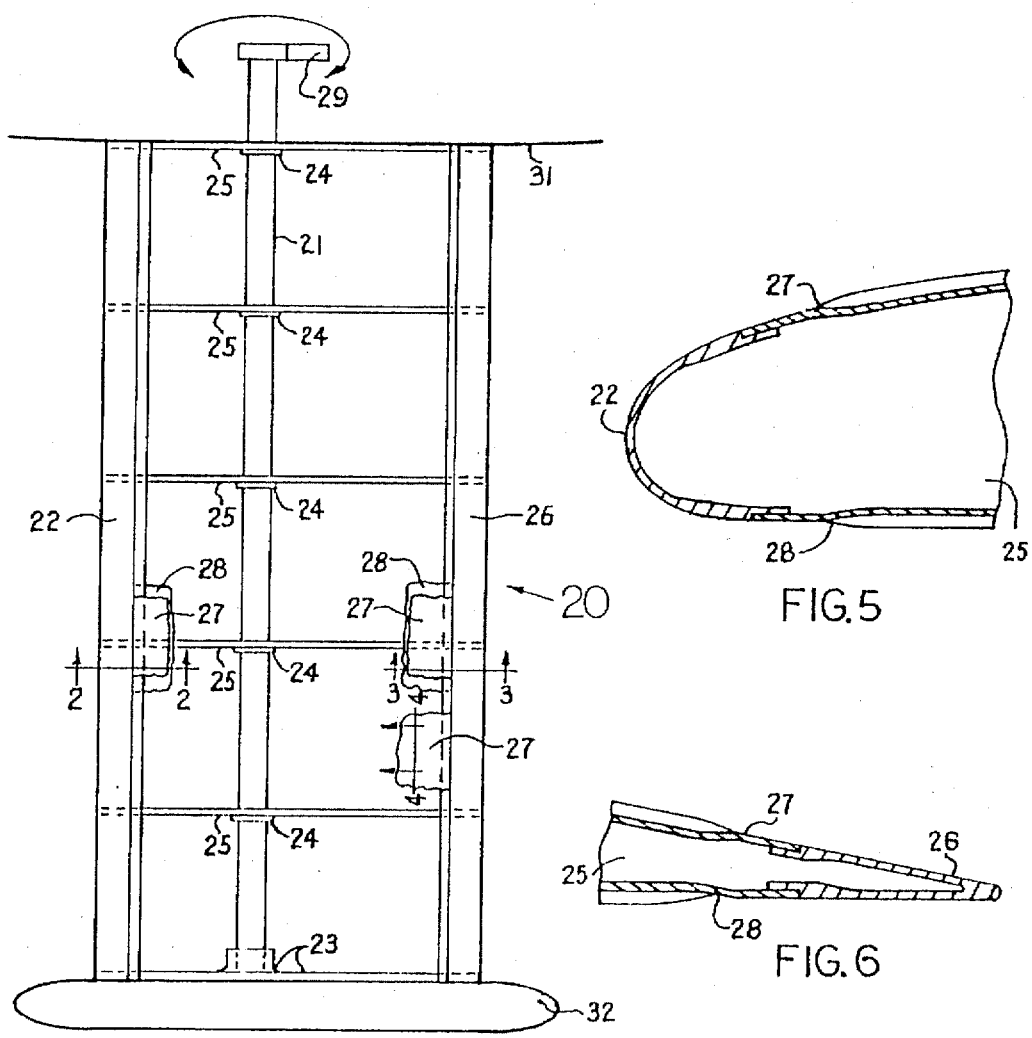
FIG 1
FIG.2
FIG.3
FIG.4
FIG.5
FIG.6
FIG.7

5,681,014

TORSIONAL TWIST AIRFOIL CONTROL MEANS

This application is a Continuation-in-part of Ser. No. 07/885,037, filed May 15, 1992, now abandoned.

FIELD OF INVENTION

The present invention relates to the construction of airfoils, more particularly to wing construction using an arrangement for providing lateral roll control, lift, manuerability and automatic deicing control.

BACKGROUND OF INVENTION

The present aircraft wing technologies utilize trailing edge ailerons and spoilers for roll control and flaps, both leading and trailing edge to increase aerodynamic lift for decreasing runway lengths for take offs and drag for reducing approach speeds for landings; also for maneuverability at high and low airspeeds. These control devices are used universally on all current aircraft, and are all similar in concept and function.

Transonic and supersonic flight have always posed control problems for aircraft in making the transition from subsonic flight. Conventional aileron control reversal has long been a problem, being caused by the interaction of the aileron control surfaces and elastic deformation of the wing. At transonic speeds, a torsionally elastic wing, common on high performance aircraft, with a downward deflection of the aileron produces a twist that diminishes the angle of attack at the wing tip and thereby reduces the lift acting on the tip section and the rolling moment. Thus the actual roll moment may be smaller than the same aileron deflection would provide on a rigid wing. The effect increases with airspeed and at higher airspeed, approaching supersonic airspeeds, the function of the aileron will be neutralized and then reversed.

In view of the forgoing, it is an object of the present invention to provide an airfoil control means and method of using the same in aircraft lateral roll control, aerodynamic lifting and braking devices and automatic deicing of airfoil surfaces.

FIELD OF SEARCH

Patent classification: 244/2/45A/51/75R/89/90R/123/134A/152/184/198/211/232

DESCRIPTION OF PRIOR ART

Adequate lateral roll control and lift control functions with minimum drag have plagued aircraft designers since the inception of aviation. In the early days of aviation, wing warping, controlled by wires, was used by the Wright brothers and others to provide a means of roll control for aeroplanes.

Roll control and lift control devices which in function superficially resemble the novel roll and lift control devices invented by the applicant are disclosed in the following U.S. patents.

| U.S. Pat. No. | Patentee(s) | Issue Date |
|---|---|---|
| 821393 | O. & W. Wright | May 22,1906 |
| 983697 | Igo Etrich | Feb. 7,1911 |
| 1054484 | John Anderson | Feb. 25,1913 |
| 1132686 | James Rooney | Mar. 23,1915 |
| 1145013 | Edson Gallaudet | Jul. 6,1915 |
| 3734432 | George Low | May, 22,1973 |
| 4729528 | Angelo Borzachillo | Mar. 8,1988 |

U.S. Pat No. 821,393 FLYING MACHINE (O. & W. Wright) One of the objects of this patent was lateral control of the two superimposed aeroplanes by helicoidal warp or twist actuated by the pilot laterally shifting his body while lying on a cradle, connected by ropes to the aeroplanes.

U.S. Pat. No. 983,697 SUPPORTING-SURFACE FOR FLYING MACHINE (Igo Etrich) Discloses a bird like monoplane design utilizing a complex system of wires or ropes to provide independent warping of the wing tip sections to produce lateral stability.

U.S. Pat. No. 1,054,484 AEROPLANE (John Anderson) Discloses a high wing monoplane with a tilting wing capability: also there is a warping section positioned at each end of the wing controlled by a cable that lifts the warping section from the top of the main plane to vary the relative angle of the carrying plane and car body. Thereby resulting in depressing that side of the carrying plane.

U.S. Pat. No. 1,132,686 AEROPLANE CONSTRUCTION (James Rooney) discloses a cable controlled wing warping aeroplane, depicted as a biplane. It uses a tubular longitudinal frame members and multiple tension wires.

U.S. Pat. No. 1,145,013 AEROPLANE (Edson Gallaudet) An improved wing construction and control mechanisms; one to vary the wing angle of incidence, the other to provide wing warping by use of cables, pulleys and pinion gears to vary the angular position of the outer with respect to the inner portion to maintain lateral balance.

U.S. Pat. No. 3,734,432 SUPPRESSION OF FLUTTER (George Low) Discloses an active aerodynamic control system to control flutter over a large range of oscillatory frequencies. Torsion and bending motions or deflections of the fluttering member are automatically controlled by leading and trailing edge control surface deflections which produce lift forces and pitching moments to suppress flutter.

U.S. Pat. No. 4,729,528 AEROELASTIC CONTROL FLAP (Angelo Borzachillo) An aeroelastic control system induces torsional or bending motions on fighter aircraft wings to enhance the roll capability of the aircraft rather than oppose such notions.

It is significant, however, that none of the prior art patents identified above are concerned with the specific problems solved by applicant.

Conventional ailerons provide more than adequate roll control at high air speeds, but are lacking in providing roll control at low airspeeds. Due to these conditions, ailerons are sized for the low airspeed roll control requirements, therefore ailerons and flaps always have large surface areas and large angular motion of operation, and the associated drag weight, construction complexity and high related costs.

SUMMARY OF INVENTION

A control means for aircraft airfoils, which is a significant improvement over the prior art of existing aileron, flap, spoiler and deicing technologies. Said means provides increased lateral roll control and aerodynamic lifting and braking functions; with greatly reduced drag, increased airspeed and precise control performance at all airspeeds, due to clean uninterrupted airfoil surfaces and directional conformance of wing to the intended flight path, lacking prior art's conventional ailerons, spoilers and flaps. This is accomplished by use of a torque tube mounted internally within the airfoil structure, substantially aligned with and ahead of the airfoil linear axis, positioned for aerodynamic balance and firmly attached to the airfoil tip structure. The inboard end of said airfoil structure is firmly attached to the fuselage.

In operation the inboard end of the torque tube is rotated on its pivot axis by a control system. It imposes a helicoidal twist on the airfoil structure, with maximum angular displacement or angle of incidence at the outboard tip and progressively lower angles of incidence as measured closer to the inboard end of the airfoil. The torque tube can be operated by conventional control systems e.g. cable/pulley, electric/hydraulic servo etc.

Advanced fighter aircraft frequently fly at transonic and supersonic airspeed. With today's control technology, they are continuously exposed to wing surface wrinkling, due to large twisting roll control moments applied by high aerodynamic pressures caused by operation of ailerons and/or flaps. This invention solves the subject problem by providing an aeroelastic wing structure, comprising an upper aeroelastic skin covering, a lower aeroelastic skin covering both attached to a flexible continuous leading edge structure, a flexible continuous trailing edge structure, a set of rotatable flexible rib structures, a wing tip structure, and operated by a rotatable torque tube that is mounted on a set of anti friction bearings, which are mounted on said rotatable flexible rib structures and firmly attached to said wing tip structure.

To accomodate the aeroelastic distortion of the wing airfoil skin during the normal operation of the above helicoidal twist of the aeroelastic wing structure. I have invented the following aeroelastic surface skin covering for aircraft wings and other airfoil control surfaces as follows.

This aeroelastic wing structure that is flexible and compliant, while being made of rigid sheet material, formed aluminum or titanium; or composite fabrication, urethane/fabric epoxy/kevlar/fiberglass/carbon fiber or any combination of available engineering polymers, elastomers, and/or reinforcement fabrics or prepegs; all structural components of the aeroelastic wing structure can be fabricated using these materials.

The aeroelastic surface skin covering is formed of continuous low amplitude linear wave forms, aligned in a chordwise direction, whose amplitude and pitch, along with thickness of all components can vary to suite individual applications. The linear wave forms ends make a smooth transition from the wave form to areas that are relatively straight in a spanwise direction and blend smoothly with the flexible leading edge structure and the flexible trailing edge structure. The aeroelastic skin covering can be applied to wing structures using conventional methods. The wave forms absorb alternating tension and compressive skin forces, usually up to 1% of the diagonal span of a low aspect ratio wing and proportionally less on a high aspect ratio wing, encountered during aeroelastic deformation, while increasing stiffness in a chordwise direction.

Application of the helicoidal twist also provides automatic deicing of the wing each time the tortional twist is activated. Thin ice accumulation, due to freezing rain and sleet weather conditions, can't conform to the to the movement of the aeroelastic wing skin covering. Ice being a rigid structure, will crack seperate, and fall off with sufficient forward speed.

Present invention is unlimited in its use in the control of airfoils, ranging from hang gliders and ultra lights (these can be covered with fabric or polymer sheets, such as polyester) to small, medium and large transports and commercial aircraft, including high speed high performance aircraft.

Further applications are controllable wings for racing cars and boats, ground effect vehicles, sails, rudders and keels for sailboats, helicopter lift and tail rotors, propellers for aircraft and boats, and turbine blades.

BRIEF DESCRIPTION OF THE DRAWINGS

FIG. 1 is a plan view of an aircraft left wing extending out from the fuselage to the wing tip, equiped with torsional twist airfoil control means, torque tube, the flexible leading edge structure, the flexible trailing edge structure, a set of flexible fib structures with a set of antifriction bearings and a wing mounted fuel tank. Also fragmented sectional views 2—2, 3—3 and 4—4 of the upper aeroelastic wing surface covering and the lower aeroelastic wing surface covering.

FIG. 2 is an end view of the wing of FIG. 1 without the wing tip mounted fuel tank.

FIG. 3 is an end view of the wing of FIG. 2 operated for a right roll.

FIG. 4 is an end view of the wing of FIG. 2 operated for a left roll.

FIG. 5 is a view of section 2—2 of FIG. 1 showing the flexible leading edge structure, the upper aeroelastic wing surface covering, the lower aeroelastic wing surface covering and the flexible rib structure.

FIG. 6 is a view of section 3—3 of FIG. 1 showing the flexible trailing edge structure, the upper aeroelastic wing surface covering the lower aeroelastic wing surface covering and the flexible rib structure.

FIG. 7 is an enlarged view of section 4—4 of FIG. 1 of the aeroelastic wing covering showing the continuous low amplitude wave forms.

PREFERRED EMBODIMENT

Referring now to the drawing, FIG. 1 depicts an aircraft left wing 20, equiped that extends from a fuselage 31, with a flexible leading edge structure 22, and a flexible trailing edge structure 26, attached to the flexible wing tip structure 23, equipped with a torsional twist rotatable torque tube 21, arranged within the wing 20, and firmly attached to the flexible wing tip structure 23, positioned for in the aerodynamic center aerodynamic balance and mounted on a plurality of anti-friction support bearings 24, each of which are attached to a set of flexible rib structures 25. The torque tube 21, is mounted on said bearings 24, and is actuated by a rotational control drive means 29, a fuel tank 32, is mounted on the wing tip structure. The right wing 30 (not shown) contains all of the features of the left wing. The aeroelastic covering skins 27 and 28 absorb the alternating tension and compression forces that occur during the normal operation of the aeroelastic wing structure 20. The drawing, FIG. 2 is an end view of the wing 20, of FIG. 1, showing the wing tip structure 23, in its normal static position, without fuel tank 32. The drawing FIG. 3, is an end view of the wing 20, of FIG. 2, showing the helicoidal twist of wing 20, wing tip structure 23, differentially operated with right wing 30, (not shown) for a lateral roll to the right; or cooperated with right wing 30, (not shown) to provide increased lift for slow flight, landings take offs and maneuverability. The rotatable torque tube when differentially rotated clockwise, in mm rotates the wing tip structure, also in a clockwise direction, which imposes a helicoidal twist on the wing structure, resulting in a lateral right roll (see FIG. 3). The torque tube when differentially rotated counter clockwise, in turn rotates the wing tip structure, also in a counterclockwise direction, which imposes a helicoidal twist on the aeroelastic wing structure, resulting in a lateral left roll (FIG. 4). The twist surface profile when twisted changes from a normal airfoil surface profile to a warped airfoil surface profile.

The drawing of FIG. 4 is an end view of the wing 20 of FIG. 2, showing the helicoidal twist of the wing 20, wing tip structure 23, differentially operated with right wing 30, (not shown) for a lateral roll to the left; or cooperated with right wing 30,(not shown) to providing decreased lift for maneuverability, cooperated with elevators or canards. The drawing of FIG. 5 is an enlarged sectional view 2—2 showing the flexible leading edge structure 22, bonded to the upper aeroelastic skin covering 27, and also bonded to the lower aeroelastic skin covering 28, both showing the wave form sectional profiles with a transition blend to a relatively straight area prior to the flexible leading edge structure 22, and the leading edge of the flexible rib structure 25. The drawing of FIG. 6 is an enlarged sectional view 3—3 of FIG. 1, showing the flexible trailing edge structure 26, bonded to the upper aeroelastic skin covering 27, and also bonded to the lower aeroelastic skin covering 28, both showing the wave form sectional profiles with a transition blend to a relatively straight area prior to the flexible trailing edge structure 26, and the flexible rib structure 25. The drawing of FIG. 7 shows an enlarged sectional view 4—4 of the drawing of FIG. 1 showing the profile of the continuous low amplitude linear wave forms.

While the TORSIONAL TWIST AIRFOIL CONTROL MEANS has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

I claim as my inventions:

1. An aeroelastic airfoil control means, said aeroelastic airfoil control means providing for aircraft maneuverability control and/or automatic deicing means for a wing of an airplane, said airfoil control means including roll control means; wherein said wing provides for slow flight, high lift and maneuverability functions at both low and high airspeeds, said wing means comprising:

an aircraft aeroelastic wing structure, wherein said aeroelastic wing structure extends outwardly from a fuselage of said airplane, to a wing tip structure of said airplane, said aeroelastic wing structure comprising:

an airfoil aeroelastic skin cover that is substantially smooth and free of individual control surfaces;

wherein said aeroelastic skin cover is flexible and compliant;

said aeroelastic skin cover forms a continuous linear wave form, wherein the pitch and amplitude of the wave are variable in form;

said aeroelastic wing further including:

a flexible leading edge structure extending from said fuselage to said wing tip structure;

a flexible trailing edge structure extending from said fuselage to said wing tip structure;

a set of flexible rib structures, wherein said flexible rib structures are spaced apart and connected to said flexible leading edge structure and said flexible trailing edge structure;

an upper aeroelastic wing skin covering, wherein said upper aeroelastic wing covering is attached to the following wing structure: said flexible leading edge structure, said flexible trailing edge structure, said flexible rib structures and to said wing tip structure;

a lower aeroelastic wing skin covering, wherein said lower aeroelastic wing skin covering is attached to the following wing structure: said flexible leading edge structure, said flexible trailing edge structure, said flexible rib structures and to said wing tip structure;

a rotatable torque tube mounted internally within said aeroelastic wing structure, said rotatable torque tube extending from said fuselage to said wing tip, wherein said rotatable torque tube is substantially aligned with the aerodynamic center of the airfoil; said rotatable torque tube is positioned for aerodynamic balance.

2. The aeroelastic wing structure of claim 1, wherein said rotatable torque tube is supported by a plurality of anti-friction bearings mounted on said flexible rib structures of said aeroelastic wing structure.

3. The aeroelastic wing structure of claim 1 wherein said rotatable torque tube is a structural spar.

4. The aeroelastic wing structure of claim 1 wherein said torque tube is straight.

5. The aeroelastic wing structure of claim 1, wherein the torsional rigidity of said torque tube exceeds the torsional rigidity of said wing structure.

6. The aeroelastic wing structure of claim 1 wherein said aeroelastic wing skin cover is substantially seamless and gapless thereby reducing drag and increasing the aerodynamic efficiency of said aircraft.

7. The aeroelastic wing structure of claim 1 wherein said aeroelastic wing structure surface skin covering provides high integral strength, through the use of a continuous wing surface area and a perimeter profile that is lacking in notches, recesses and cutouts; said aeroelastic skin covering does not include conventional control surfaces.

8. The aeroelastic wing structure of claim 1 wherein said rotatable torque tube provides for automatic cracking and separation of thin ice accumulation upon actuation of a clockwise or counter-clockwise rotation of the torque tube.

9. The aeroelastic wing structure of claim 1 wherein said rotatable torque tube when differentially rotated clockwise, in turn rotates said wing tip structure in a clockwise direction, said rotation imposes a helicoidal twist on said wing structure, resulting in a lateral right roll.

10. The aeroelastic wing structure of claim 1 wherein said torque tube when differentially rotated counter clockwise, in turn rotates said wing tip structure in a counterclockwise direction, said rotation imposes a helicoidal twist on said aeroelastic wing structure, resulting in a lateral left roll.

11. The aeroelastic wing structure of claim 1 wherein said torque tube when rotated in a clockwise rotation, in tun rotates said wing tip structure in a clockwise direction, said rotation imposes a helicoidal twist on said aeroelastic wing structure, resulting in increased lift of the aircraft, thereby providing for increased maneuverability during slow flight, take-offs, or landings.

12. The aeroelastic wing structure of claim 1 wherein said rotatable torque tube when actuated in a counterclockwise rotation, in turn rotates said wing tip structure in a counterclockwise direction, which imposes a helicoidal twist on said aeroelastic wing structure, resulting in decreased lift of the aircraft, said rotation provides for increased maneuverability of the aircraft.

13. The aeroelastic wing of claim 1 wherein said aeroelastic wing structure provides for accepting a long range fuel tank at said aeroelastic wing tip.

14. The aeroelastic wing structure of claim 1 wherein said aeroelastic wing tip structure includes a long range fuel tank attached thereto, wherein said fuel tank rotates with said aeroelastic wing tip structure, when said aeroelastic structure is actuated for a lift maneuver.

* * * * *